A. P. MORROW.
BACK PEDALING BRAKE.
APPLICATION FILED AUG. 10, 1903.
906,149.
Patented Dec. 8, 1908.
2 SHEETS—SHEET 1.
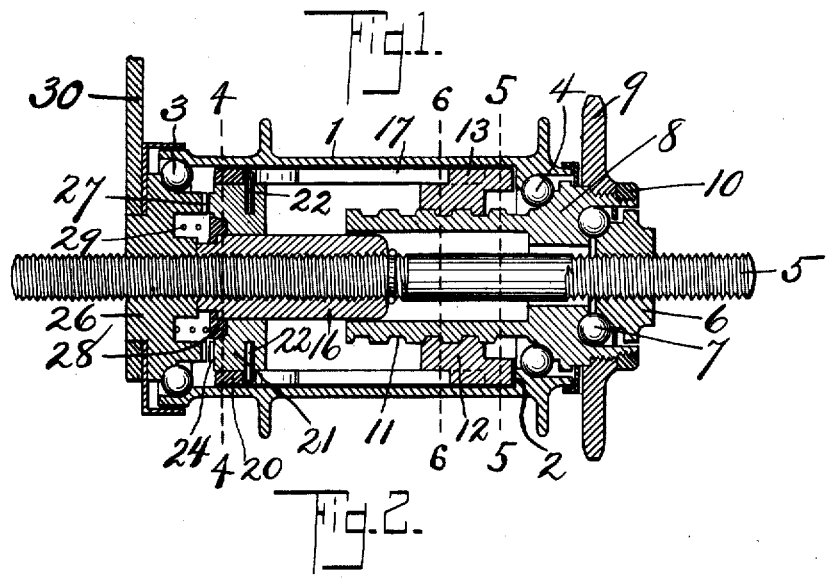
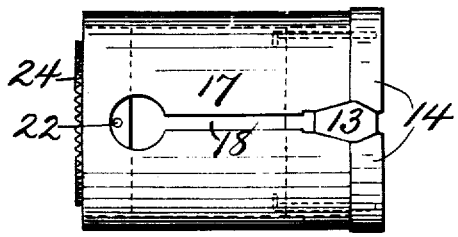
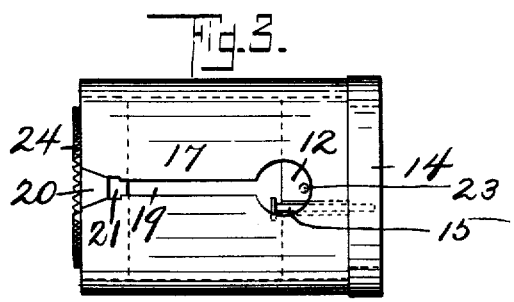
WITNESSES=
H. Gurnee
A. R. Selden.
INVENTOR=
Alexander P. Morrow
by Osgood & Davis
his Attys A. P. MORROW.
BACK PEDALING BRAKE.
APPLICATION FILED AUG. 10, 1903.
906,149.
Patented Dec. 8, 1908.
2 SHEETS—SHEET 2.
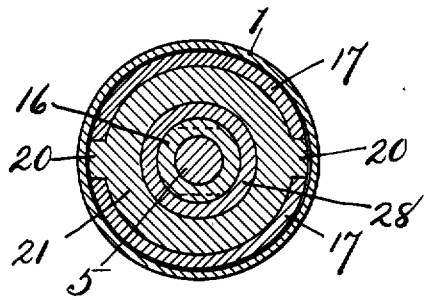
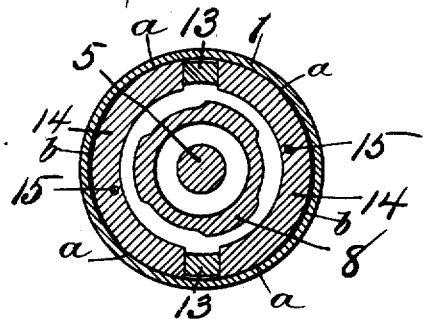
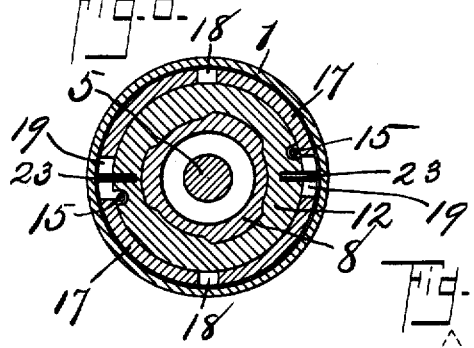
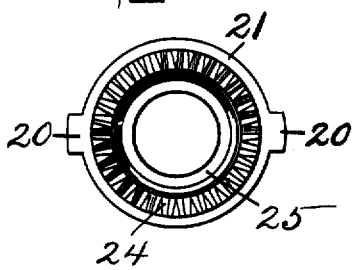
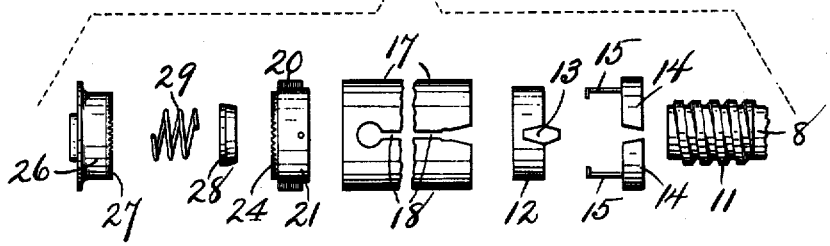
WITNESSES:
D. Gurnee
A. R. Selden.
INVENTOR
Alexander P. Morrow
by Osgood & Davis
his Attys

UNITED STATES PATENT OFFICE.

ALEXANDER P. MORROW, OF ELMIRA, NEW YORK.

BACK-PEDALING BRAKE.

No. 906,149.  Specification of Letters Patent.  Patented Dec. 8, 1908.

Application filed August 10, 1903. Serial No. 168,960.

*To all whom it may concern:*

Be it known that I, ALEXANDER P. MORROW, a citizen of the United States, and resident of Elmira, in the county of Chemung and State of New York, have invented certain new and useful Improvements in Back-Pedaling Brakes, of which the following is a specification.

This invention relates to back pedaling brakes. Its object is to produce efficient and simple mechanism, easy to assemble and to dismount.

It consists in the mechanism hereinafter described and claimed.

In the drawings:—Figure 1 is a horizontal section through a device embodying this invention; Figs. 2 and 3 are elevations of one of the movable parts; Figs. 4, 5 and 6 are cross sections respectively on the lines 4—4, 5—5 and 6—6 of Fig. 1; Fig. 7 is a view of a detail; and Fig. 8 is a view of the parts inside the hub separated.

The present embodiment of this invention comprises a hub 1 of a suitable construction having in it a shoulder 2 for a purpose hereinafter to be described, and provided also with cups at its ends for the series of balls 3 and 4 of the ball bearings. Through the axis of the hub passes the axle 5 to which the vehicle frame is attached. At one end of the hub the axle carries the cone 6 which forms a guide for the series of balls 7 which rest also against a cup formed in the driving member or sleeve 8 which carries the sprocket wheel 9 held on said sleeve by the lock nut 10; the driving sleeve 8 carries means for actuating the braking means and the driving means, which in the present instance are the screw threads 11 on said sleeve which engage with a screw threaded block 12 carrying wedges or expanding devices 13 for actuating the driving clutch and the braking mechanism. The driving clutch consists of a split ring 14 in the present case composed of two parts and carried within the hub adjacent to the shoulder 2, so that when the wedge or wedges 13 move toward the right by movement of the sleeve 8 caused by forward pedaling, the separated ends of the ring 14 expand against the hub, longitudinal movement being resisted by the shoulder 2. This locks the driving member and the hub together so that they are driven as one part.

The segments 14 have peripheral end portions $a$, Fig. 5, formed on the same radius as the interior of the hub 1. Between said end portions $a$ the peripheries of the segments 14 are depressed, as at $b$, so as not to make contact with the hub when the segments are separated. When the segments are forced against the hub in opposite directions by the wedges 13, the end portions $a$ of each segment operate by a wedging action against the hub and a powerful effect results; and this is the more powerful because this wedging action is itself produced by the wedges 13. It will be noted that the segments 14 are free in the hub.

In order that the split ring 14 shall remain in place, especially if made in two or more pieces, each portion of said ring is provided with a stem 15, having an enlarged end and said stem passes through a slot, smaller than the head, in the block 12, but of such size or shape as to permit the clutching movements; and since the stem or stems 15 are longer than the thickness of the block 12 the ring is held to said block but is capable of longitudinal movement for expansion and contraction.

The axle 5 has an enlargement 16 either fastened upon or integral with it, which forms a centering support for the inner end of the driving sleeve 8 and also forms a guide for a part hereinafter described and a stop for determining the proper position of the axle and enlargement; and it also constitutes a support and guide for a portion of the brake apparatus. The brake member is composed of several parts comprising an expansible member consisting of a sleeve 17 preferably of cylindrical form, and slotted from the end of the cylinder to near the other end thereof. These slots 18 are open and tapered at one end so as to fit upon the wedge 13. One or more slots may be employed; and if more than one, then one or more of the slots 19 may run from the left hand end, see Fig. 3, of the sleeve 17, toward but not to the right hand end of said sleeve. The outer end of each slot 19 is tapered and fits upon a wedge 20 upon a block 21 fitting inside the end of the sleeve 17 and capable of movement therein. The block 21 is held in the sleeve 17 by means of pins 22 driven into the block and in one form through the end of the slot 18. Likewise the block 12 is held in the sleeve 17 by pins 23 fastened in said block 12 and extending outward through the ends of the slots 19. The outer or left hand end of the block 21 carries a series of teeth or corrugations 24 constituting part of a brake-operating clutch and said block has a tapered hollow 25 in its center. Into the end of the hub 1 extends a block 26 having upon its under face a series of corrugations 27 constituting the other part of the brake-operating clutch and adapted to engage corrugations 24 above mentioned. The block 26 acts as a cone for the series of balls 3 and carries also between it and the ring 21 a retarding device consisting of a ring 28 fitting in the hollow cone 25 of the ring 21 and normally pressed into said hollow cone by a spring 29 which bears against the block 26, and normally maintains disengagement of the brake-operating clutch.

The block 26 is screwed upon the axle and has its bearing against the end of the enlargement 16 which latter enlargement is reduced at its end so as to take upon it the ring 28 and to maintain it into position.

The block 26 carries also a brake arm 30 as usual, for attachment to the frame of the vehicle or bicycle to which this device may be applied. The block 26 and its attached parts constitute a stationary brake support that is operative when the brake operating clutch is engaged.

The operation of the mechanism is as follows: Upon forward pedaling the sprocket wheel 9 is driven in one direction, moving the block 12 toward the right in Fig. 1, forcing the wedges 13 between the ends of the driving clutch 14, expanding the clutch against the hub, and connecting the parts for driving the hub forwardly. If it is desired to coast, the feet are held stationary which stops the movement of the sprocket wheel and driving sleeve 8, while the hub 1 continues to revolve forwardly. The effect of this movement of the hub is to carry with it the block 12 and to cause said block to run slightly toward the left on the threads 11 of the sleeve 8. This draws the wedge 13 from the clutch 14 and releases the connection of said clutch with the hub, thus permitting the hub to continue its rotation free from the driving clutch or other parts. If the rider desires to apply the brake, the pedal rotation is reversed thereby turning the sleeve 8 so as to force the block 12 further toward the left and to compress the spring 29. The retarder ring 28 tends to hold the block 12 stationary while the sleeve 8 revolves, and thus secures certainty of action of the parts. The reverse rotation of the sleeve 8 just described forces the wedges 13 into the tapered ends of the slots 18, thereby expanding the sleeve 17 at that end, and at the same time moving the whole sleeve and the block 21 toward the left. This brings the corrugations 24 on the block 28 into engagement with corrugations 27 on the stationary block 26 and locks the clutch parts together so that the block 21, brake sleeve 17, and block 12 are held stationary. This further movement of the block 12 toward the left forces the sleeve 17 on the wedges 20 and drives said wedges into the slots 19, thereby expanding the sleeve 17 at the left hand end. As soon as the sleeve 17 is expanded, it makes frictional contact between the brake member and the interior of the hub 1 and, being held stationary by the brake support, resists rotation of the hub as may be desired by the rider. By forward pedaling the sleeve 8 is turned in the forward direction and the block 12 moves toward the right, pulling with it the sleeve 17, disengaging the block 21 from the block 26, and thereby discontinuing the brake action and setting the driving clutch. It will be noticed that there are four principal parts in this mechanism:—First, the hub; second, the driving sleeve 8 carrying the sprocket wheel 9; third, the brake sleeve 17 carrying the brake clutch block 12 and the driving clutch 14; and fourth, the stationary block or support 26. This brake is composed of a few parts, is easy to assemble and dismount, has a minimum friction for accurate operation, and has a large braking surface.

The enlargement 16 of the axle is flattened as shown by the dotted lines in Fig. 4, and the retarder ring 28 is formed to fit thereon in order that said retarder ring should not be capable of revolution.

As shown in Fig. 5, the outer peripheral end portions of the sections 14 of the driving clutch, are adapted to make contact with the interior of the hub 1, but the said clutch sections do not make contact with the hub at points between the said outer peripheral end portions $a$. When the wedges 13 separate the ends of the clutch section 14, said ends move directly away from each other and there is a powerful wedging engagement between the ends of the clutch sections 14 and the interior of the hub. The intermediate portions $b$ of the clutch sections 14 between said outer peripheral end portions $a$ do not come in contact with the hub and therefore do not resist the separation of the clutch sections. The driving clutch formed in this way is much more powerful than if the clutch sections made contact with the hub at points midway or substantially midway between the ends.

In the operation of this device the brake member rotates with the hub during forward driving, is stationary with the driving member during coasting and is stationary when braking, being held so by the brake support 26. There is of course some slight rotary movement of the brake member with reference to the driving member, sufficient to shift the wedges and operate the driving clutch on forward pedaling, to release the driving clutch when holding the pedals stationary and to set the brake upon back pedaling.

The fact that the brake member revolves with the hub during forward pedaling and driving of the vehicle, removes a chance of friction which exists in many back pedaling brakes. In this device there can be no detrimental friction if the brake member itself revolves with the hub during forward pedaling and driving of the vehicle.

What I claim is:

1. In a brake mechanism, the combination of an axle, a hub thereon, a driving member, a brake anchor, a longitudinally movable expansible friction-brake member mounted within the hub, and means actuated by said driving member for connecting said brake member to said brake anchor by longitudinal movement of the former in the hub and expanding said brake member against said hub by the same movement.

2. In a brake mechanism, the combination of an axle, a hub thereon, a driving member projecting into one end of the hub, a brake anchor, a longitudinally movable expansible friction-brake member mounted within the hub, and means actuated by said driving member for connecting said brake member to said brake anchor by longitudinal movement of the former in the hub and expanding said brake member against said hub by the same movement.

3. In a brake mechanism, the combination of an axle, a hub thereon, a driving member, means for driving said hub forwardly by said driving member, a brake anchor, a longitudinally movable expansible friction-brake member mounted within the hub free from said hub and from said brake support, and means actuated by said driving member for connecting said brake member and said brake anchor by longitudinal movement of the former in the hub and expanding said brake member against said hub by the same movement.

4. In a brake mechanism, the combination of an axle, a hub thereon, a driving member, a brake anchor, a longitudinally movable expansible friction-brake sleeve within the hub rotatable with and also differently from said driving member, and means actuated by said driving member for connecting said brake member to said brake anchor by longitudinal movement of the former in the hub to hold the brake member stationary and expanding said brake member against the hub by the same movement.

5. In a brake mechanism, the combination of an axle, a hub thereon, a driving member projecting into the hub, a stationary brake support, a brake sleeve within the hub having longitudinal slots part way the length of the sleeve, wedging means adapted to enter the slots longitudinally and to expand said sleeve against the hub, and means actuated by said driving member for engaging said sleeve with said brake support to hold the sleeve stationary and to expand said sleeve by said wedging means.

6. In a brake mechanism, the combination of an axle, a hub thereon, a driving member, a brake anchor, a longitudinally movable expansible friction-brake member mounted within the hub, clutching means between the brake member and the brake anchor effected by longitudinal movement of the brake member in the hub and clutching means between the driving member and the hub, and means actuated by the driving member releasing said clutches alternately and for setting and expanding said brake member against the hub by the same movement.

7. In a brake mechanism, the combination of an axle, a hub thereon, a driving member, a brake anchor, a longitudinally movable expansible friction-brake member within the hub carried by the driving member, and means of which the driving member is part for making connection and disconnection between said brake member and said brake anchor and expanding said brake member against the hub, said connection and disconnection and brake expansion being effected by longitudinal movement of the brake member in the hub.

8. In a brake mechanism, the combination of an axle, a hub thereon, a driving member, a brake anchor, a longitudinally movable expansible friction-brake member within the hub carried and actuated by the driving member and adapted to rotate with the hub during forward driving and to be held stationary by the brake anchor upon back pedaling and to be free from the hub and the brake anchor while the pedals are stationary, and means of which the driving member is a part for making connection and disconnection between said brake member and said brake anchor and expanding said brake member against the hub, said connection and disconnection and brake expansion being effected by longitudinal movement of the brake member in the hub.

9. In a brake mechanism, the combination of an axle, a hub thereon, a driving member, a brake anchor, two clutch members, one movable longitudinally to engage the anchor and the other adapted to engage the hub, an expansible friction-brake member within the hub, rotatively connected with both said two clutch members, one movable longitudinally for engaging the brake anchor and the other adapted to engage said hub, and means actuated by the driving member when moving in the rotary direction to operate one clutch first mentioned to connect the brake member and the brake anchor and to expand the brake member against the hub by the same movement, and when the driving member is moving in the other direction to disconnect the brake member from said brake anchor and actuate the other clutch to connect the driving member with the hub.

10. In a brake mechanism, the combination of an axle, a hub thereon, a driving member, a brake anchor having one part of a brake-operating clutch, a longitudinally movable brake operating clutch member adapted to engage the anchor and a driving clutch member; an expansible friction-brake member within the hub adapted to be forced into contact with the hub and rotatively connected with said brake-operating clutch and said driving clutch member, and means actuated by the driving member when moved in one rotary direction for connecting the two parts of said brake-operating clutch by longitudinal movement of the brake member in the hub and expanding said brake member against the hub by the same movement and when the driving member is moved in the opposite rotary direction for connecting said driving clutch member with the hub.

11. In a brake mechanism, the combination of an axle, a hub thereon, a driving member, a stationary brake support having one member of a brake operating clutch, a brake member composed of a slotted sleeve and the other member of said brake operating clutch, and wedging means actuated by said driving member for simultaneously engaging said clutch members and for expanding the slotted portion of said sleeve.

12. In a brake mechanism, the combination of an axle, a hub thereon, a driving member, a stationary brake support, an expansible brake member having a clutch for engaging with and disengaging from said brake support, and a longitudinally movable part actuated longitudinally by said driving member for connecting said brake operating clutch and for expanding said brake member against the hub.

13. In a brake mechanism, the combination of the axle 5, the hub 1, the driving sleeve 8, having the screw threads 11, the stationary brake support 26 having the clutch part 27, the brake member consisting of the slotted sleeve 17, the brake operating clutch part 21 carried by said sleeve and adapted to engage the clutch part 27, the screw threaded block 12 running on the threads of the driving sleeve 8 and having wedges longitudinally movable by rotation of the sleeve 8 into the slotted portions of the brake sleeve 1, oppositely arranged wedges, the driving clutch member 14 adapted to be expanded by said oppositely arranged wedges upon rotation of the driving sleeve in the opposite direction.

14. In a brake mechanism, the combination of the axle 5, the hub 1, the driving sleeve 8, having the screw threads 11, the stationary brake support 26 having the clutch part 27, the brake member consisting of the slotted sleeve 17, the brake operating clutch part 21 carried by said sleeve and adapted to engage the clutch part 27, the screw threaded block 12 running on the threads of the driving sleeve 8 and having wedges longitudinally movable by rotation of the sleeve 8 into the slotted portions of the brake sleeve 1, oppositely arranged wedges, the driving clutch member 14 adapted to be expanded by said oppositely arranged wedges upon rotation of the driving sleeve in the opposite direction, and a retarder for said brake member.

15. In a brake mechanism, the combination of the axle 5, the hub 1, the driving sleeve 8, having the screw threads 11, the stationary brake support 26 having the clutch part 27, the brake member consisting of the slotted sleeve 17, the brake operating clutch part 21 carried by said sleeve and adapted to engage the clutch part 27, the screw threaded block 12 running on the threads of the driving sleeve 8 and having wedges longitudinally movable by rotation of the sleeve 8 into the slotted portions of the brake sleeve 1, oppositely arranged wedges, the driving clutch member 14 adapted to be expanded by said oppositely arranged wedges upon rotation of the driving sleeve in the opposite direction, and a spring for normally separating said brake operating clutch members.

16. In a brake mechanism, the combination of a hub, a driving member, a split friction-brake member, a split driving clutch member consisting of two separate sections, and a block actuated by said driving member and having a double wedge adapted to enter the split portions of said brake member and between the ends of the sections of said driving clutch for setting them respectively.

17. In a brake mechanism, the combination of a hub, a driving member, a split friction-brake member, a split driving clutch member, a block actuated by said driving member and having a double wedge adapted to enter the split portions of said brake member and of said driving clutch for setting them respectively, a stationary brake support, and means for connecting said brake member and said brake support by movement of said block in one direction.

18. In a back pedaling brake mechanism, a wheel hub, a driving member, a brake member adapted to be set by said driving member and a driving clutch consisting of a split ring composed of two free separate sections each having radial projections at both ends adapted to make contact with said hub, the said sections being free from the hub between said end portions, and means actuated by said driving member for moving said sections bodily apart in opposite directions on forward pedaling.

19. In a back pedaling brake mechanism, a wheel hub, a driving member, a brake member adapted to be set by said driving member and a driving clutch consisting of a split ring composed of two free separate sections each having radial projections at both ends adapted to make contact with said hub the sections being free from the hub between said end portions, and wedging means actuated by said driving member for moving said sections bodily apart in opposite directions on forward pedaling.

20. In a brake mechanism, the combination of an axle, a hub thereon; a driving member at one end of the hub having a sleeve projecting therein; a brake anchor at the opposite end of the hub; an expansible friction-brake member located within the hub between said driver and said anchor; a longitudinally shiftable part revolubly connected with said brake member, having a spiral connection with the said sleeve of the said driving member, whereby said shiftable part is moved longitudinally on back pedaling, to engage with and disengage from the anchor; and means operated by the driver, and including said shiftable part adapted on forward pedaling to connect the driver with the hub, and on back pedaling to expand the brake member.

ALEXANDER P. MORROW.

Witnesses:
GEO. H. COUPER,
D. L. WHITTIER.